United States Patent [19]
Peterson et al.

[11] Patent Number: 5,697,078
[45] Date of Patent: Dec. 9, 1997

[54] WIDEBAND CHANNEL SNIFFER FOR MONITORING CHANNEL USE IN A WIRELESS COMMUNICATION SYSTEM

[75] Inventors: Dean F. Peterson, Andover; Russell J. Cyr, Pepperell; Derek W. Gallon, Jamaica Plain; James C. Camp, Sudbury, all of Mass.

[73] Assignee: Steinbrecher Corporation, Burlington, Mass.

[21] Appl. No.: 609,214

[22] Filed: Mar. 1, 1996

Related U.S. Application Data

[63] Continuation of Ser. No. 218,678, Mar. 25, 1994, abandoned.

[51] Int. Cl.$^6$ ............................................. H04B 1/18
[52] U.S. Cl. .................. 455/190.1; 455/33.1; 455/54.1; 455/62; 375/347
[58] Field of Search .................... 455/33.1, 34.1, 455/53.1, 54.1, 56.1, 62, 63, 67.1, 69, 70, 102, 103, 180.1, 189.1, 190.1, 234.1, 234.2, 249, 1, 250.1; 375/347, 348, 349

[56] References Cited

U.S. PATENT DOCUMENTS

| | | | |
|---|---|---|---|
| Re. 32,789 | 11/1988 | Lynk Jr., et al. | 455/34.1 |
| 4,037,152 | 7/1977 | Griffith | 324/79 R |
| 4,296,374 | 10/1981 | Henry | 324/77 B |
| 4,355,414 | 10/1982 | Inoue | 455/250.1 |
| 4,423,413 | 12/1983 | da Silva | 340/825.03 |
| 4,866,710 | 9/1989 | Schaeffer | 370/95.1 |
| 4,950,999 | 8/1990 | Agnello et al. | 324/77 B |
| 5,027,431 | 6/1991 | Tanaka et al. | 455/214 |
| 5,058,107 | 10/1991 | Stone et al. | 455/189.1 |
| 5,067,171 | 11/1991 | Kawano | 455/33 |
| 5,099,243 | 3/1992 | Tsui et al. | 324/78 D |
| 5,150,362 | 9/1992 | Akerberg | 370/95.1 |
| 5,162,724 | 11/1992 | Katayama et al. | 324/77 B |
| 5,239,676 | 8/1993 | Strawczynski et al. | 455/33.2 |
| 5,367,539 | 11/1994 | Copley | 455/33.1 |

OTHER PUBLICATIONS

Alan Reiter, "Business Opportunities in Next Generation Wireless Technologies", Advanced Wireless Communications, vol. 4, No. 10, pp. 1–7, May 12, 1993.

Steinbrecher, "Steinbrecher Debuts Versatile MiniCell Base Station Transceiver", Mobile Phone News, p. 5, Mar. 15, 1993.

Steinbrecher, "MiniCell Base Station Transceiver", Steinbrecher News Release, Mar. 1993.

Cellular Digital Packet Data System Specification, Release 1.0, Jul. 19, 1993, Book I of V, pp. 225-1-6; 230-1-6; 405-1-40; 408-1-42; 1010-1-8.

Primary Examiner—Reinhard J. Eisenzopf
Assistant Examiner—Thanh Le
Attorney, Agent, or Firm—Fish & Richardson P.C.

[57] ABSTRACT

Channel use in a wireless communication system is monitored for each radio frequency channel spanning a broad allocated bandwidth simultaneously. A transmission having signals in channels spanning the bandwidth is broadband downconverted in analog before being transformed to produce an instantaneous representation of signal levels in each channel. The instantaneous representation is stored. In addition, a statistic characterizing historical use of at least one of the channels in the bandwidth is calculated from the instantaneous representation.

29 Claims, 14 Drawing Sheets

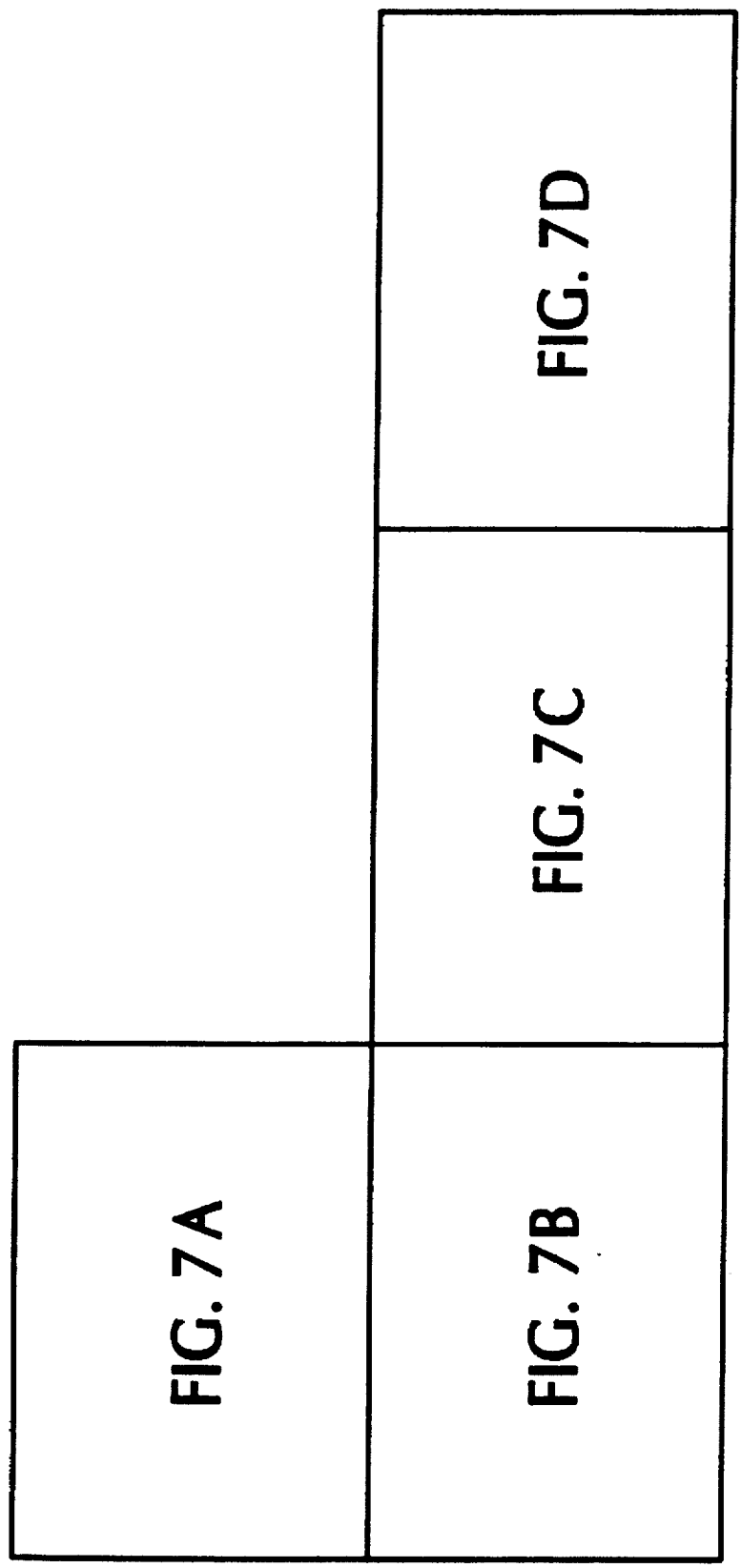

5,697,078

WIDEBAND CHANNEL SNIFFER FOR MONITORING CHANNEL USE IN A WIRELESS COMMUNICATION SYSTEM

This is a continuation of application Ser. No. 08/218,678, filed Mar. 25, 1994, now abandoned.

REFERENCE TO SOURCE CODE APPENDICES

This application contains eight source code appendices.

BACKGROUND OF THE INVENTION

This invention relates to monitoring channel use in a communication system.

Wireless transceivers, e.g. telephone, radio or television transceivers, exchange information over a fixed set of narrowband channels that span an allocated bandwidth. In cellular telephone communications, for example, 1024 transmission channels spaced 30 kHz apart form a 25 MHz spectrum with a base frequency of 869.04 MHz. Reception channels are also spaced 30 kHz apart beginning at a base frequency of 825 MHz. Each transmission channel in the cellular bandwidth is paired to a reception channel for use in two-way communications.

Cellular networks are subdivided into cells with each cell allotted 54 transmission channels per carrier company, for example. A subscriber to a given carrier company must utilize one of the 54 channels within a cell when placing a call. Since each channel supports only one call at a time, the subscriber's telephone must first locate and select a free channel over which to communicate. If the subscriber subsequently moves into a neighboring cell, e.g. if he is using a telephone while driving, the telephone must switch to a new channel of the 54 that are allotted the neighboring cell.

In order to avoid a communication gap while switching, cellular transceivers must quickly allocate free channels for use. Typically, a central processor called a "switching office" scans channel activity and allocates free channels to each transceiver in a cell.

SUMMARY OF THE INVENTION

In general, in one aspect, the invention features monitoring channel use in a wireless communication system having radio frequency channels spanning a broad allocated bandwidth. A transmission carrying signals in the channels is broadband downconverted in analog before being transformed to produce an instantaneous representation of signal levels in each channel of the allocated bandwidth simultaneously. The instantaneous representation is then stored, and a statistic characterizing historical use of at least one of the channels is calculated from the instantaneous representation.

Preferred embodiments of the invention may include the following features. The channels comprise narrowband frequency channels separated by a constant frequency spacing. The transmission is downconverted to a frequency below a base frequency of the allocated bandwidth. The downconverted output is bandpass filtered to remove signals corresponding to signals outside the allocated bandwidth in the transmission. The downconverted and bandpass filtered transmission is periodically sampled to produce a series of digitized samples used in producing the instantaneous representation. The transmission is variably attenuated before being downconverted according to whether at least one of the samples exceeds a predetermined threshold.

If the allocated bandwidth is the cellular spectrum, the transmission is downconverted using a 864 MHz local oscillator to produce a baseband output, and signals outside a range between 5 and 30 MHz are removed from the downconverted transmission.

The series of digitized samples is stored before being fast Fourier transformed with either a Winograd or Cooley-Tukey transform to produce the instantaneous representation. A total of n samples are produced at a sampling frequency ($f_s$), a ratio ($f_s/n$) corresponding to the constant frequency spacing of the channels. For example, if the channels are cellular channels with a constant frequency spacing corresponding to 30 kHz, a sampling frequency of 61.44 MHz produces 2048 total frequency samples.

In addition, a channel list is chosen from the channels in the instantaneous representation and provided to a transceiver for use in exchanging signals. In one application, the monitored transmission is a cellular voice transmission and the channel list is used to identify available channels for communicating cellular digital packet data signals.

The channel list is arranged according to the statistic characterizing historical use of at least one of the channels. The statistic comprises a signal level in the channel, or a measure of the likelihood of future use of the channel, for example, a duty cycle or static time calculated from successive instantaneous representations of signal levels in the channels.

The invention thus provides a wideband channel sniffer that produces a frequency domain representation of all active channels spanning a broad band simultaneously. By simultaneously monitoring each channel in the band, the sniffer locates all free channels in the cellular spectrum virtually instantaneously. This essentially eliminates any time lag between the instant a channel clears and the moment the sniffer detects that it is no longer occupied, allowing the sniffer to immediately inform a transceiver that a previously busy channel is now free and ready for use. The sniffer thus greatly decreases the likelihood and length of communication gaps between transceivers employing the free channels located by the sniffer.

A typical scanner, by contrast, processes a single channel at a time in about 10 ms for each channel, so that cycling through all 1024 channels in the cellular band requires a time much greater than a typical time constant of the sniffer. In addition, the scanner has a considerable time lag in detecting that a busy channel has cleared, since the scanner waits until all other channels are scanned before remonitoring the busy channel.

The sniffer thus provides a valuable tool for increasing the information flow over the existing cellular voice network by allowing a transceiver to make efficient use of free channels in the network. In particular, the sniffer allows a seamless integration of cellular digital packet data (CDPD) transceivers into the existing voice network, by indicating to the CDPD transceivers free channels over which CDPD information can be communicated without interfering with existing voice transmissions.

Other features and advantages of the invention will become apparent from the following description, and from the claims.

BRIEF DESCRIPTION OF THE DRAWINGS

FIGS. 5A through 5C are connected.

FIG. 7E is a schematic showing how FIGS. 7A through 7D are connected.

DESCRIPTION

Overview

Figure 1:
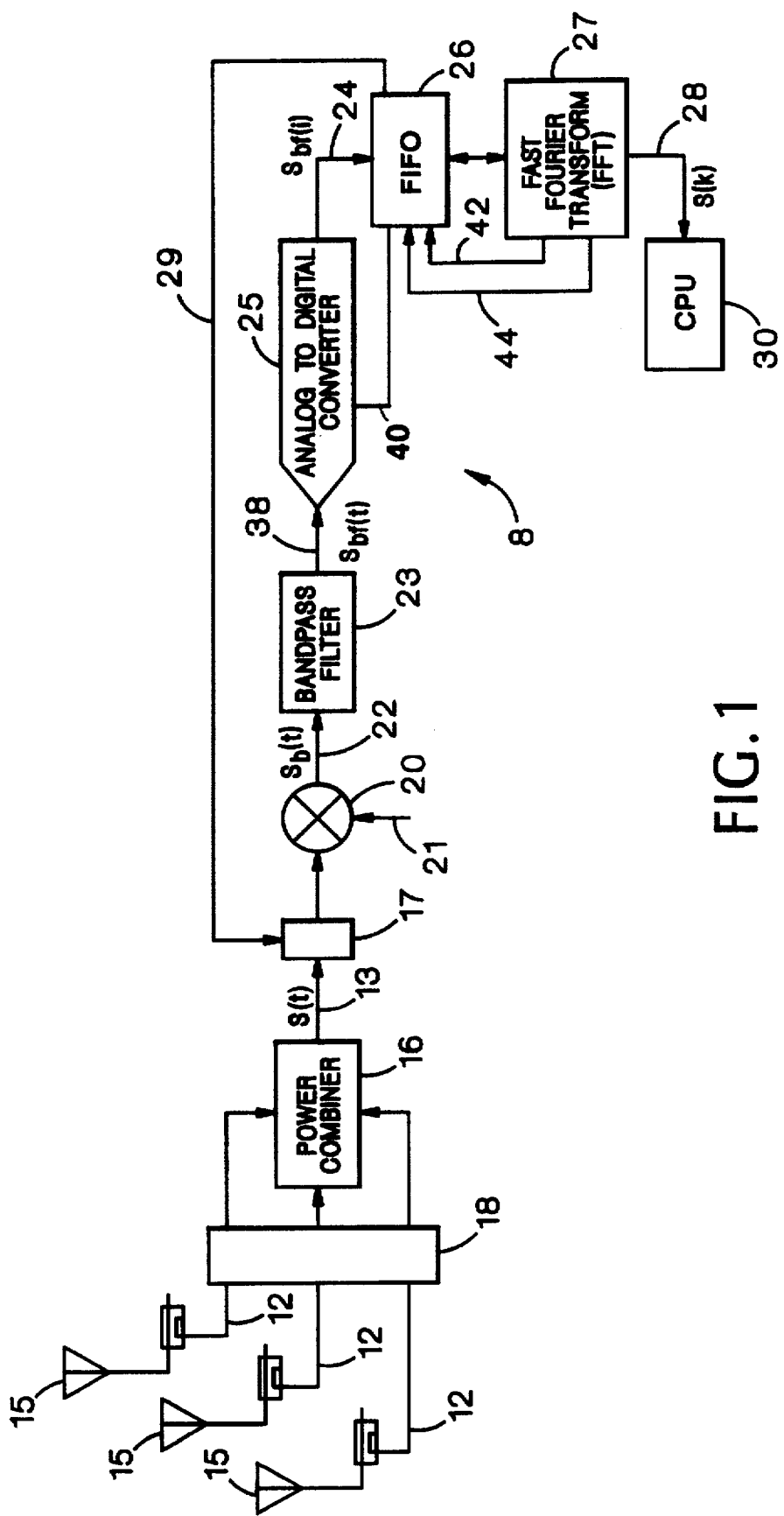
FIG. 1 is a block diagram of a sniffer connected to a transmitter, according to the invention.

The wideband sniffer 8 of FIG. 1 passively monitors cellular voice transmission signals 12 from each of three sector transmitters 15 in a cell. Each sector transmitter transmits signals in channels spanning a portion of the cellular spectrum. The sniffer monitors the signals with a 30 dB attenuating coupler 18 connected directly to an antenna cable between a final power output stage and a transmit antenna in each transmitter. The sniffer adds signals 12 together in a power combiner 16 to produce a wideband profile s(t) 13 spanning the entire cellular band. The attenuating coupler 18 also ensures that the power level of s(t) is reduced to a range of sniffer operation, e.g. between +7 and +17 dBm.

By coupling off the transmission signals directly from each antenna cable, the sniffer is able to directly sample the transmissions before they are corrupted over the air, e.g. by multipath fading. As a result, the transmission signals occupy a narrow dynamic range dictated by the power output stages in each transmitter, which are typically standard across all three sector transmitters. The sniffer thus couples off and detects transmission signals with a constant signal strength or power level across channels. This allows the sniffer to easily set a threshold signal strength above which a channel is classified as occupied. Transmission signals detected over the air, by contrast, may be attenuated to a level below any threshold set by the sniffer and thus would be likely to be misclassified as unused. In addition, by monitoring only the transmission signals, each of which is paired to a reception channel in the cellular band, the sniffer is able to monitor all channel use across the cellular band.

This allows the sniffer to communicate to a cellular digital packet data transceiver a list of free voice channels without in any way interfering with existing voice transmissions, i.e. the sniffer need only passively monitor those transmissions from the input to each sector transmitter. In addition, the sniffer enables the transceiver to communicate CDPD over the cellular voice band without interfering with voice communications. For example, by instantaneously monitoring all voice channel use simultaneously and in quick succession, the sniffer is able to continuously update the transceiver on existing activity in the voice channels. This allows the sniffer to immediately detect when a previously free channel begins to carry a voice transmission, and to inform the transceiver that the previously free channel is now unavailable for CDPD use. The transceiver can then quickly change its communications over to an unused channel found by the sniffer.

Sniffer 8 receives profile s(t) in a variable attenuator 18 before broadband downconverting s(t) in a mixer 20 provided with a local oscillator frequency 21. The baseband output $s_b(t)$ 22 of the downconverter is filtered by an anti-aliasing bandpass filter 23 before being converted to a digitized series of samples $s_b(i)$ 24 in an analog-to-digital converter 25. The output $s_b(t)$ of the converter is stored in a first-in first-out (FIFO) buffer 26 before being fast Fourier transformed in a digital signal processor (DSP) 27. The output S(k) 28 of the DSP is an instantaneous representation of signal levels contained in profile s(t) in each channel (k) of the allocated cellular bandwidth.

Digital signal processor (DSP) 27 also calculates other statistics related to channel use, and controls variable attenuator 18 with a control signal 29 transmitted through FIFO 26, as described in more detail below. The statistics are transmitted to a central processing unit (CPU) 30 connected to the sniffer, which selects free channels for use by a transceiver from S(k) and the channel statistics. The CPU is also used to load the Fourier transform and other routines into the DSP, as outlined below.

Figure 2:
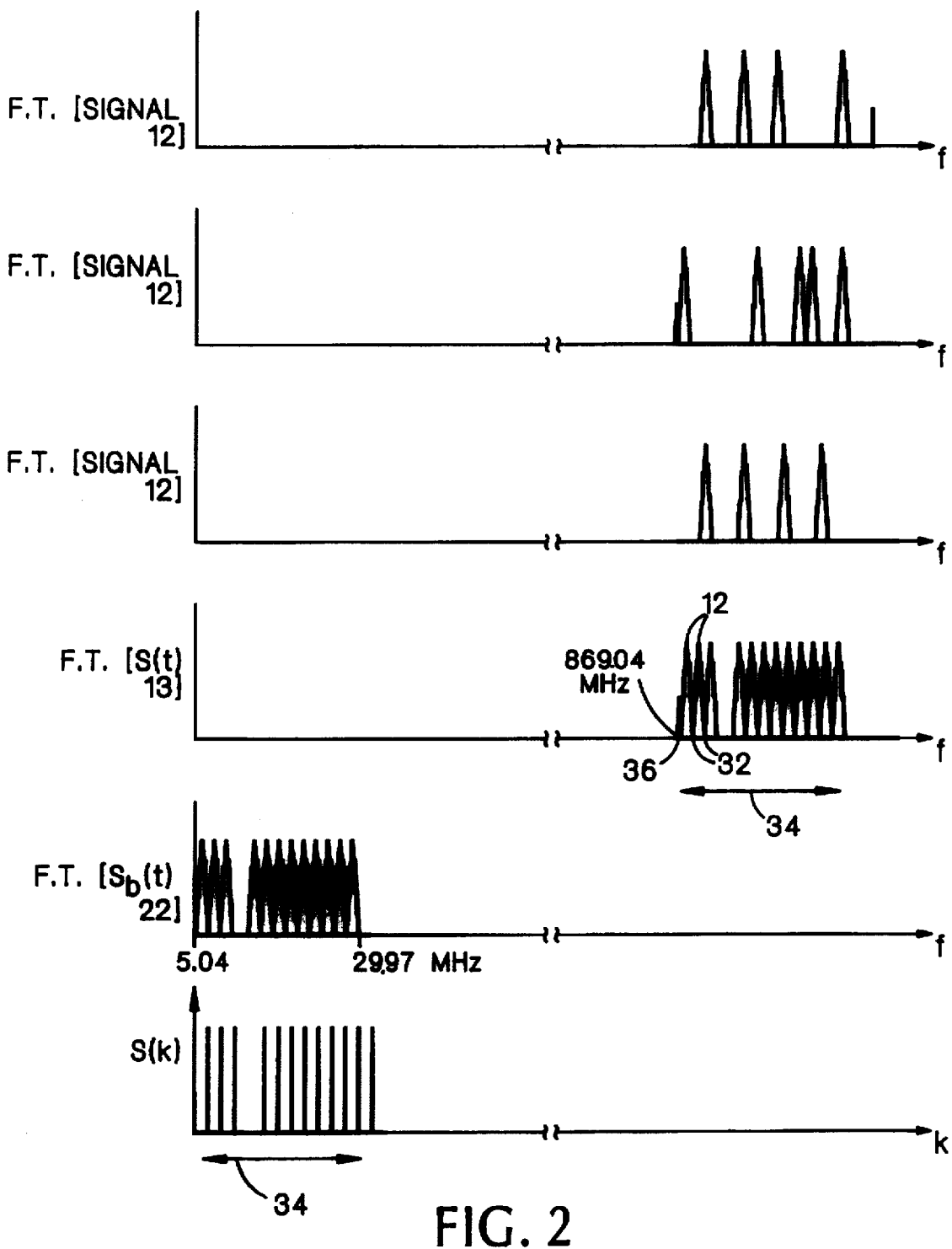
FIG. 2 is a set of graphs showing signals in the sniffer and transmitter of FIG. 1 in the frequency domain.

Referring to FIG. 2, profile s(t) (shown in the frequency domain as the Fourier transform F.T. {s(t)}) contains signals 12 in channels 32 spanning the entire allocated cellular band 34 beginning at a base frequency $f_{base}$ 36. Mixer 20 (FIG. 1) has a local oscillator frequency ($f_{lo}$) 21 below fbase to broadband downconvert the attenuated profile s(t) from the variable attenuator to produce output $s_b(t)$ 22. A typical $f_{lo}$ is 864 MHz, though a frequency closer to 866 MHz more effectively prevents aliasing in the subsequent sampling of the profile s(t) by the A/D converter 25.

The downconverted spectrum $s_b(t)$ spans 5.04 to 29.97 MHz. Bandpass filter 23 following the mixer has a pass band of 5 to 30 MHz to remove all signals outside this band from $s_b(t)$ to produce filtered output $s_b(t)$ 38. The removed signals correspond to transmissions outside the cellular band in the profile s(t), e.g. radio and television signals. The bandpass filter has sharp cutoffs, leaving virtually no signal outside $s_b(t)$, to prevent aliasing in the sampled output $S_b(i)$ of the analog-to-digital (A/D) converter 25.

The A/D converter 25 samples filtered transmissions $s_b(t)$ 38 at a sample rate $f_s$ of 61.44 MHz, which exceeds the Nyquist frequency (50 MHz) of $s_b(t)$. FIFO 26 following the A/D converter stores 8 bits for every n=2048 consecutive samples or sample points of $S_b(t)$. A higher resolution (i.e. 10 bit) A/D converter taking a larger number of sample points at 61.44 MHz improves performance.

The FIFO is synchronized by sample clock 40 (FIG. 1) in the A/D converter to read only true sample points from the converter, and to ignore noisy bits produced as the converter transitions from one sample point to another. The FIFO is also controlled by an ENABLE signal 42 from the DSP chip 16, which causes it to start storing or writing the sample points, and a READ signal 44 forcing it to send the sample points one by one to the DSP.

In order to maintain a high speed of processing, the FIFO performs a fast acquisition of the data bits. A larger FIFO, such as a 4096×8 bit FIFO, significantly increases the time needed to process the bits in the FFT. However, when faster DSP FFT chips become available, a larger FIFO may be used to advantage.

The DSP 27 transforms the sample points $s_b(i)$ 24 from the FIFO to the frequency domain with a fast Fourier transform (FFT). Each bin (or frequency sample) of the FFT occurs at integers k, such that $$k = \frac{f_s}{n} \quad j = \frac{61.44}{2048} \, j \text{ MHz} = 30j \text{ kHz for } j = 0, 1, 2, \ldots 1023 \quad (1)$$

The 61.44 MHz sampling frequency thus ensures that all cellular channels (spaced 30 kHz apart) fall in the FFT bins k.

The FFT is a Cooley-Tukey transform that efficiently bulk processes input sample points $s_k(i)$. The Cooley-Tukey FFT of the 2048 samples of $s_k(t)$ is performed in 2048*$\log_2$ (2048) operations, a factor of approximately 100 fewer operations than the number required to filter each channel individually, e.g. in a sequential channel scanner. The Cooley-Tukey transform can be used in any instance where the number n of samples processed is an integer power of 2. Alternatively, a Winograd transform is used, in which n may be any number that is not prime.

The DSP output S(k) is thus a simultaneous representation of signal strength in each channel 32 over the entire cellular band 34 spanned by the transmission profile s(t) 13. The DSP also stores the Fourier transforms of successive sets of 2048 sample points from the FIFO, from which it calculates statistics of the channels based on S(f), for example, the state, duty cycle and static time of each channel, described below.

The DSP 27 further controls the variable attenuator 17 to prevent A/D converter 25 (FIG. 1) from "clipping", i.e. from receiving a signal with a signal strength or voltage exceeding the input limitations of the converter. The A/D converter sets a flag in an overflow bit supplied to the DSP whenever any sample exceeds the converter's maximum input voltage. After the DSP first detects that the flag is set, the DSP 27 continues to monitor the overflow bit sent by the A/D converter for a preset number of samples. If the converter indicates to the DSP that clipping has subsided by resetting the flag within the preset number of samples, the DSP does not adjust the variable attenuator. If, however, clipping continues for the preset number of samples, the DSP sends a control signal 29 through the FIFO indicating to the variable attenuator to further increase attenuation of the incoming profile s(t).

After the DSP has increased the attenuation, it continues to monitor the overflow bit from the converter. If clipping subsides for a given number of samples, the DSP sends a new control signal 29 to the variable attenuator indicating that it must return to its previous lower level of attenuation. If, on the other hand, clipping begins again and continues for the preset number of samples, the DSP sends a control signal to the variable attenuator indicating that attenuation should again be increased.

The DSP thus maintains a minimum level of attenuation needed to prevent clipping in the A/D converter. This prevents the variable attenuator from over-attenuating and possibly suppressing weak signals in the profile s(t).

Figure 3:
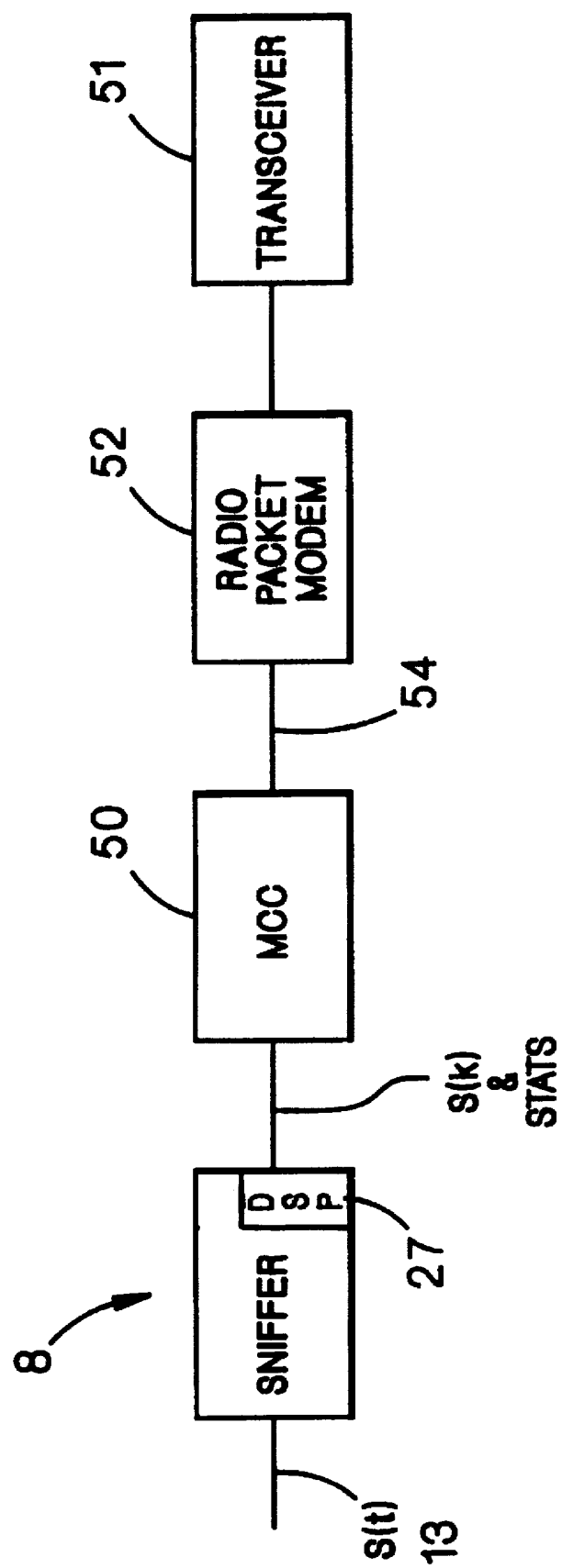
FIG. 3 is a block diagram of a data base station containing the sniffer of FIG. 1.

The channel statistics and S(k) from the DSP are processed in the CPU 30 (FIG. 1) that chooses one or more channels for subsequent use by a transceiver. Referring to FIG. 3, in an example of a CDPD mobile data base station 48, DSP 27 in sniffer 8 is connected, for example, over an ISA bus to a CPU provided by a MCC 486 motherboard 50, available as MDI486-33 from Mylex Corporation, in Fremont, Calif. The MCC 486 also contains software that allows the MCC 486 to download FFT and channel statistics algorithms into the DSP, as described in more detail below. Other fast central processing units can also be used.

The MCC typically stores channel information indicating which of 54 channels per carrier in the cellular spectrum are allocated to the cell in which a transceiver 51 is located. The MCC uses the channel information together with the channel statistics supplied by the DSP to select a sequence of free channels for the transceiver. The MCC then transmits this sequence to a radio packet modem 52 over an ethernet 54 that tunes the transceiver sequentially to the channels selected by the MCC 486. The radio packet modem also provides modulation information to the transceiver for encoding and transmitting data over the channels selected by the MCC 486. The sniffer and MCC 486 thus together act as a channel selector for the transceiver in the base station.

Channel Selection Algorithm

Figure 4:
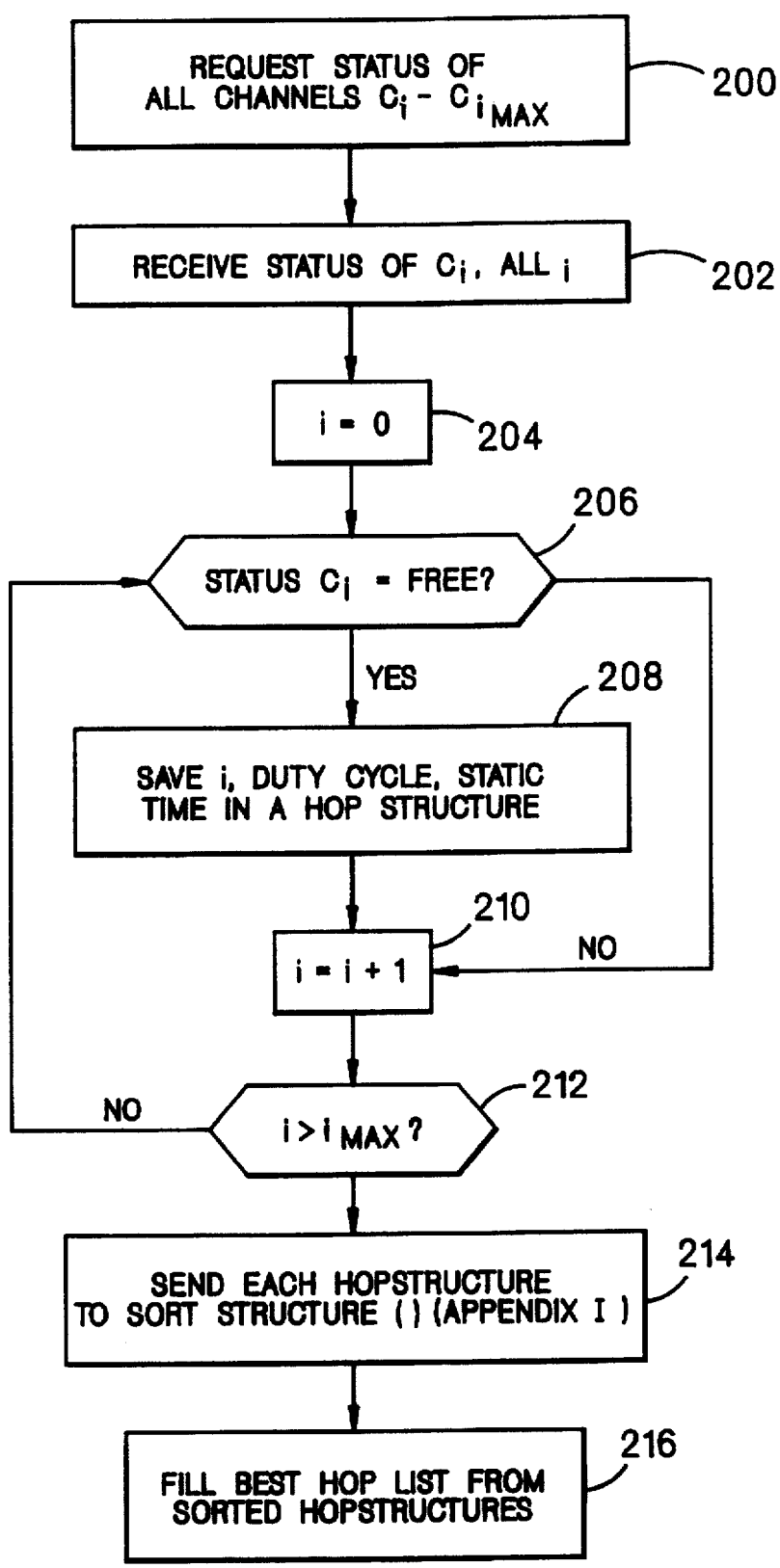
FIG. 4 is a flowchart for a channel selection algorithm.

An example of a channel selection algorithm implemented by the MCC 486, shown in FIG. 4, produces a "best hop list" of channels the transceiver consecutively attempts to use for exchanging information. The best hop list ranks the channels according to the likelihood that they will be free when the transceiver attempts to access them. This determination is based on both the instantaneous state of the channel (whether it is free or in use) and the history of the channel as measured by the DSP.

The history of each channel is characterized by both the channel's duty cycle and its static time. The duty cycle is a measure of the time-averaged activity in a channel, defined as ($200 \times t/t_0$), where t is the time in which power levels in the channel are above a given signal threshold T in a total time interval $t_0$. The duty cycle is measured in half percents, so that a channel with a duty cycle of 200 is active 100% of the time. A channel with a shorter duty cycle is thus statistically less likely to be used for voice transmissions at any given instant.

The static time of a channel is a measure of how long a given channel has remained in its present state (either active or inactive). If a channel has been inactive for a relatively long time, it is more likely to be selected for use by a voice system. A channel with a short static time is thus more likely to be free at any given instant than a channel with a longer static time.

An example of algorithm used by the DSP to calculate the channel statistics is discussed in detail below, in connection with Appendix 2.

Returning to FIG. 4, the channel selection algorithm implemented by the MCC 486 begins by requesting from the DSP the status of all channels $c_i$, i=0, 1, 2 ... $i_{max}$ in the spectrum to be analyzed (step 200). The status of each channel includes the state of the channel (active or free), its duty cycle and its static time. After receiving the status of each channel (step 202), the iteration step i is initialized to zero (step 204).

The algorithm then checks whether the first channel $c_0$ is inactive, i.e. whether the DSP has determined that the power level of the channel is below the signal threshold T (step 206). Power levels below T are assumed to be purely due to channel noise. If $c_0$ is free, the index i, duty cycle and static time of the channel are saved in a memory array called a hop structure (step 208).

The index of the iteration is then incremented by one (step 210) and compared to the maximum index of the channels $i_{max}$ (step 212). If the index i is less than $i_{max}$, then all channels have not yet been examined, and the algorithm returns to step 206.

If a channel $c_i$ is not found to be free in step 206, the algorithm skips ahead to step 210 and increments the index of the iteration before looking at the next channel. Thus, no hop structure is formed for any channel $c_i$ that is currently in use.

Each hop structure is then sent to the sorting subroutine sortstructure() given in Appendix I, (step 214). Sortstructure() ranks each hop structure according to shortest duty cycle. If two channels have the same duty cycle, sortstructure() lists the channel with the shorter static time first. For example, if sortstructure () is input hop structures with the following (index, duty cycle, static time) profiles:

(0, 50, 100); (1, 10, 50); (2, 60, 90);

(6, 10, 6); (9, 60, 110); (10, 5, 100);

sortstructure() will output the index list: 10, 6, 1, 0, 2, 9.

The selection algorithm then produces the best hop list by listing the channels in the same order as the index list provided by sortstructure() in step 216. A transceiver following the best hop list provided by the MCC 486 will subsequently attempt to access channels in the order in which they are most likely to be free.

FFT and Channel Statistics Algorithms in the Sniffer

Referring to Appendix 2, the MCC includes a "z.c" program that initiates and controls communications between the MCC and the DSP, loads the FFT and other software onto the DSP, and tests the DSP functions. Header files included in the program are standard C language compiler headers. A "spc31.h" header file is supplied by the DSP manufacturer (e.g. Texas Instruments in Dallas, Tex.), and is included in Appendix 3. This header file contains interface information between the operating system of the MCC (dos) and the DSP.

Within a main() routine in z.c, the MCC initializes the DSP, loads the FFT and other codes with a load_init_dsp() command and instructs the DSP to perform the codes. The program is configured so that the DSP waits for a command (dspproceed) from the disk operating system (DOS) before performing a code. Similarly, the DSP instructs the MCC to wait until it is ready to receive a command from the MCC with a "pcproceed" command.

When instructed to proceed, the DSP obtains a first set of 2048 sample points from the FIFO from which it produces S(k) and other statistics which are then reported back to the MCC. The MCC is thus updated on the status of channels in the cellular spectrum every 100 ms or so.

A typical channel statistics and FFT program loaded by the MCC into the DSP with the "load_init_dsp()" commands is "sniffdsp.c" shown in Appendix 4 Header file "math.h" (Appendix 5) is a standard math header file provided by the DSP manufacturer. Header files "fft.h" and "sniffer.h" (Appendices 6 and 7, respectively) define variables, flags and constants used in "sniffdsp.c". In addition, file "snfft.c" (Appendix 8) includes the algorithms used in actually calculating the FFT.

Figure 7A:
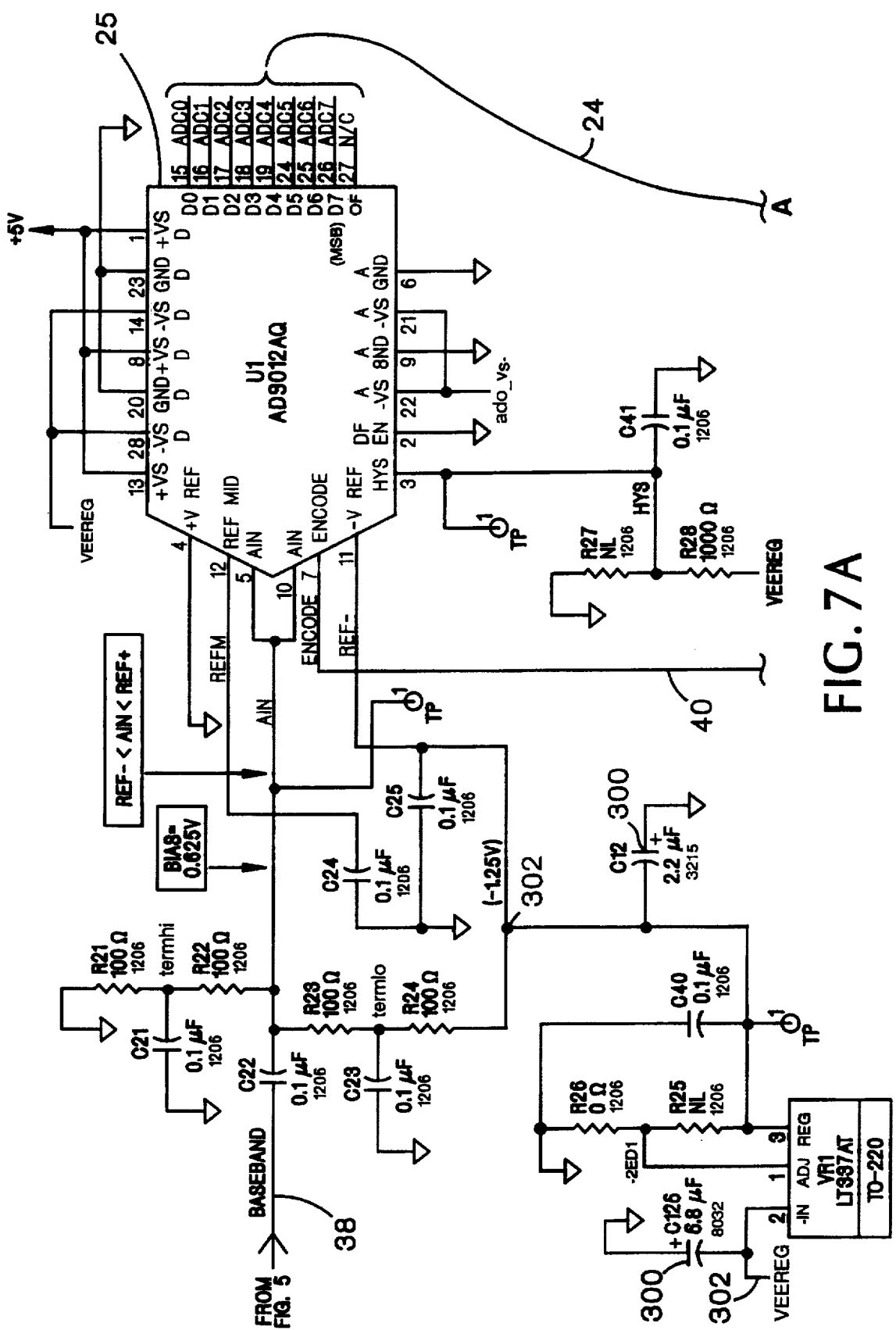
FIGS. 7A though 7D are circuit diagram of another portion of the sniffer of FIG. 1, including a digitizer and buffer processing an output of the portion of the circuit shown in FIG. 5C.
Figure 7B:
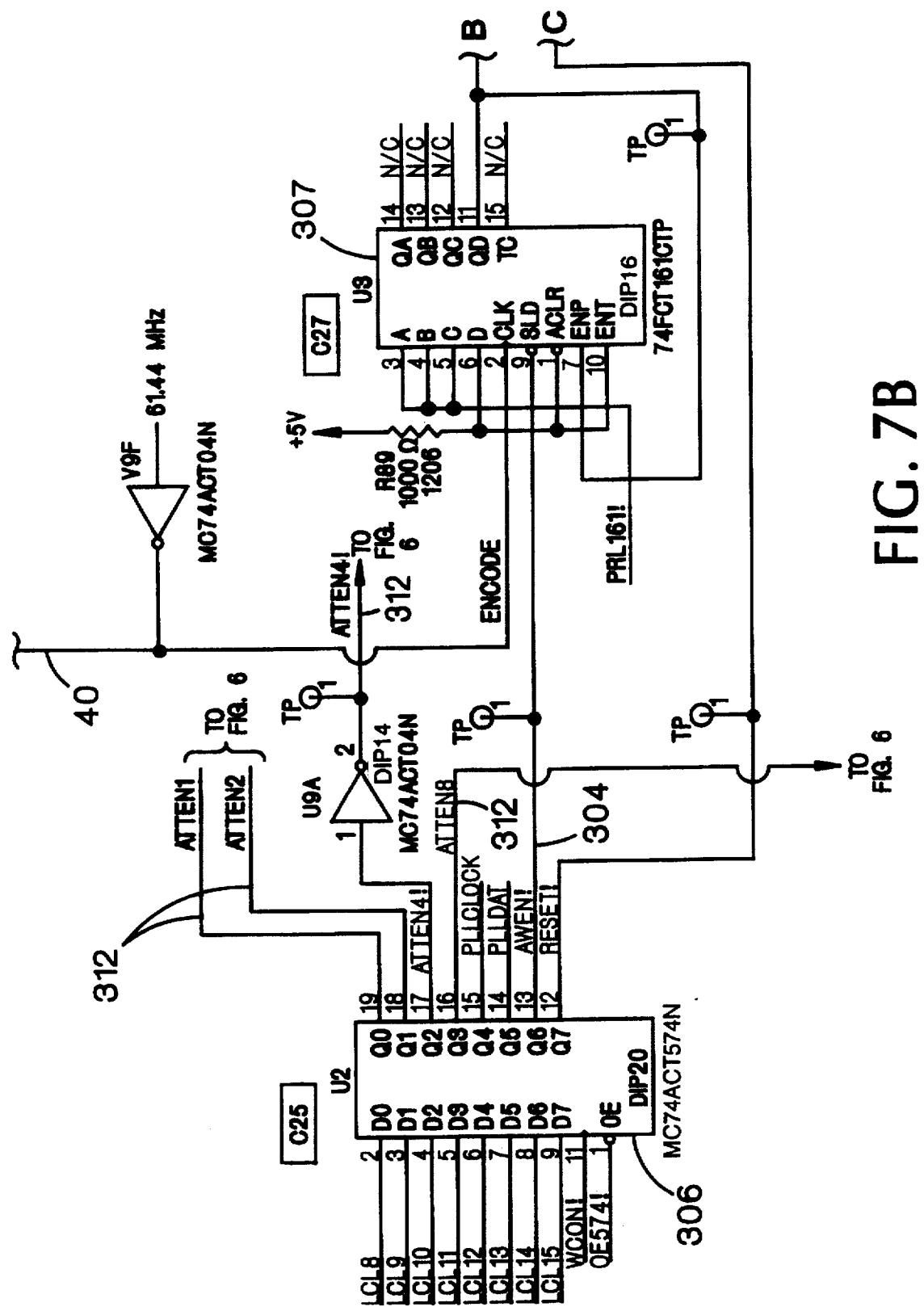
Figure 7C:
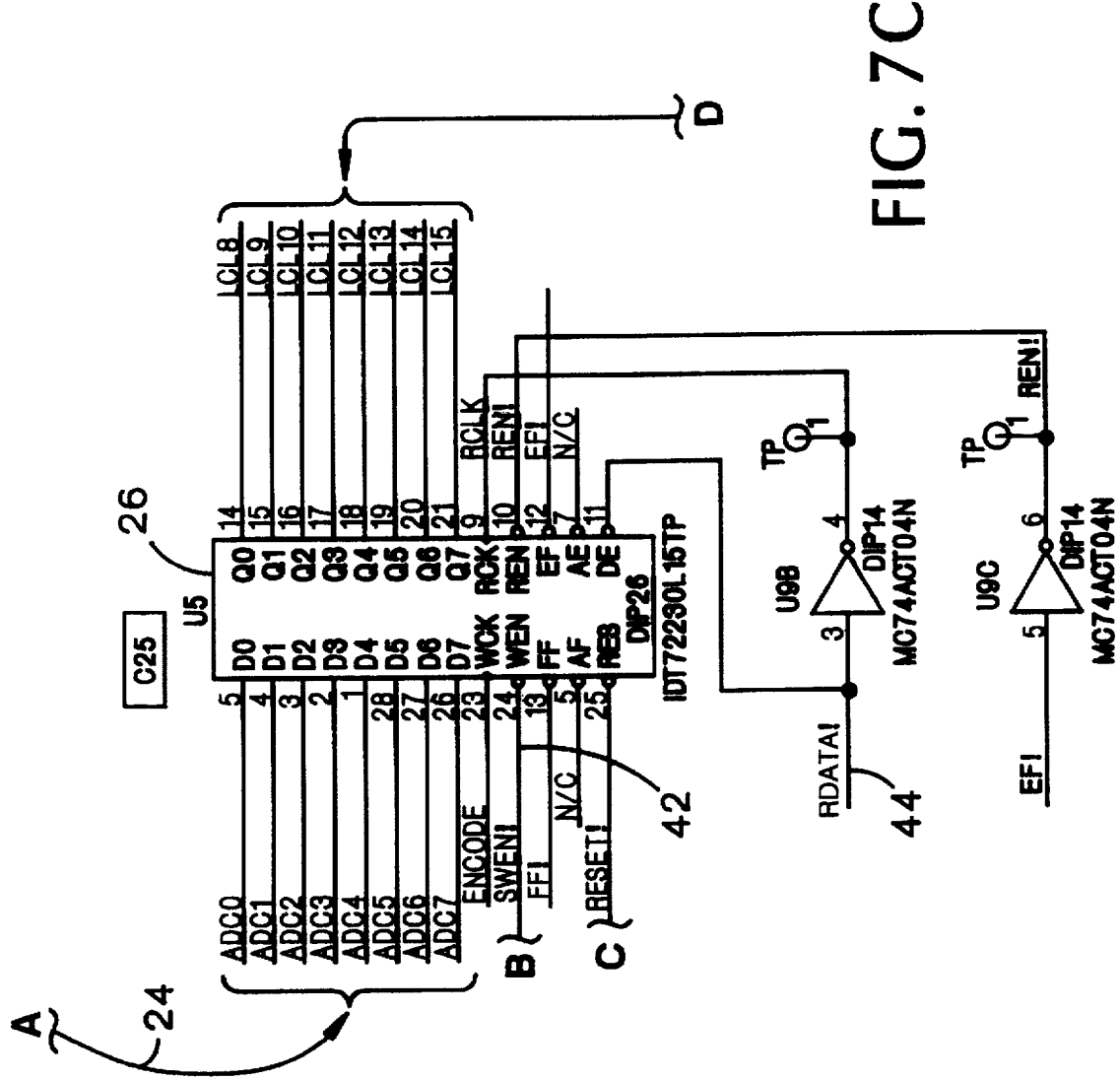
Figure 7D:
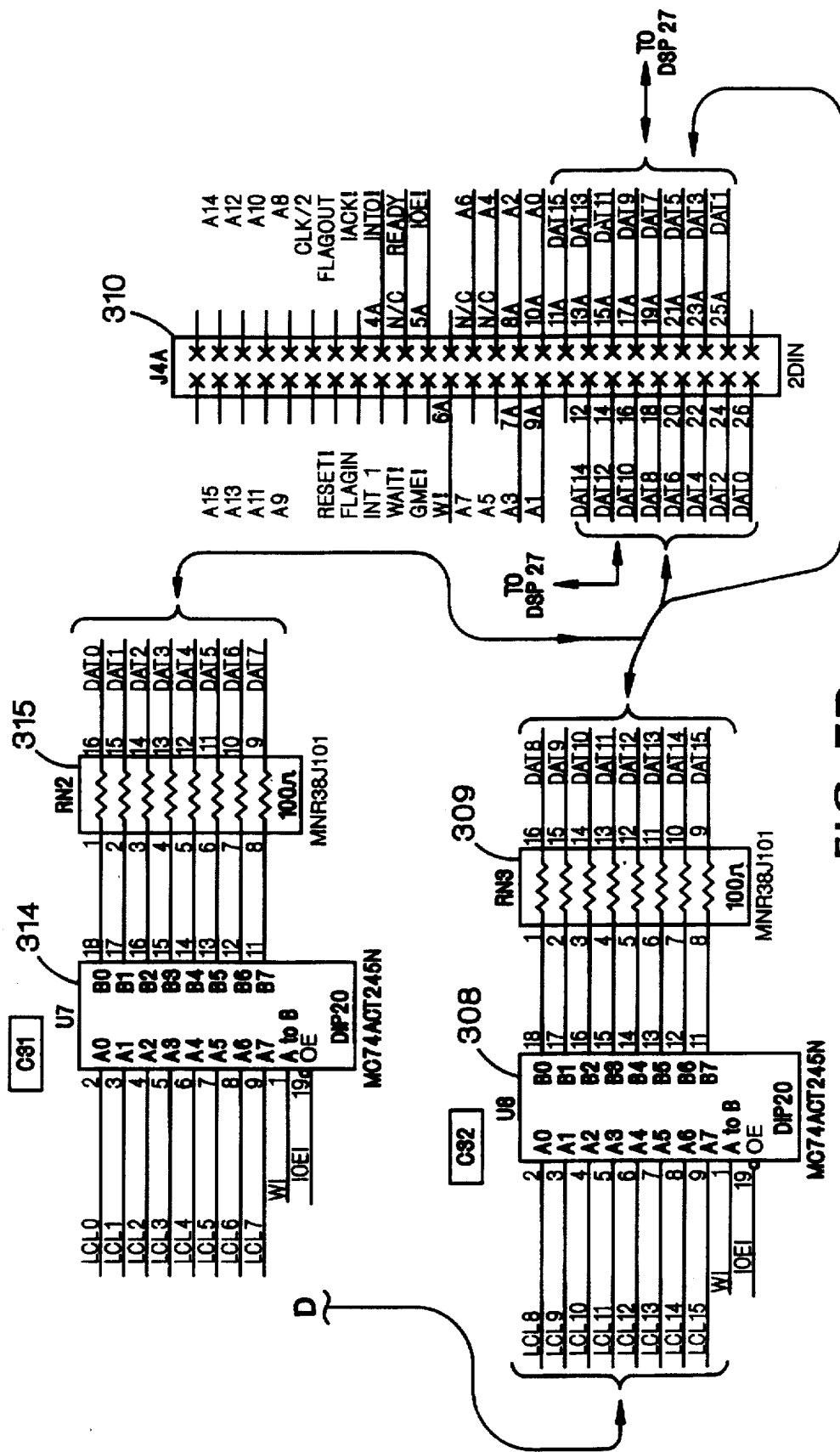

Function main() in "sniffdsp.c" first generates sine and cosine tables and indicates to the MCC that the DSP is ready to proceed. In an infinite "for" loop, 32 bit words (representing four sample points) acquired by the DSP from the FIFO are converted by "convert_long_to_float()" to a floating point number with a lowest voltage output from the A/D converter (e.g. 128 V for the converter in FIG. 7A) initialized to zero.

"FFT_real" (defined in "snfft.c") then calculates power versus channel position of the FIFO samples using a pointer to the FIFO samples ("dataaddr"), a pointer to the cos/sin table (cstaddr), and the number of channels in the spectrum (syze=1024). A fast Fourier transform is computed for each iteration of the "for loop". Next, "compute_chan_params_1" and "compute_chan_params_2" compute static time and duty cycle for each active channel based on the results of "FFT_real". When the MCC submits a request to the DSP, the DSP submits a response containing the FFT and channel statistics to the DSP.

Detailed Structure of Sniffer

The sniffer is constructed with all hardware elements, including the variable attenuator, mixer, bandpass filter, A/D converter and FIFO, on a single printed circuit board. Referring to FIGS. 5A through 5D, variable attenuator 18 (a AK002D4-24 model available from Alpha Corporation in Woburn, Mass.) remains inactive until gate voltage 248 reaches −4 V. Switch circuit 250, shown in FIG. 6, regulates the attenuator input signals 252 to ensure signals 252 are at ground when gate voltage 248 is not at −4 V by opening switches 254. When the gate voltage reaches −4 V, switches 254 close, and the attenuator is activated.

Circuitry 256 on the printed circuit board produces the local oscillator frequency 21 for the mixer 20 (TUF MH-1 available from Mini-Circuits Corporation in Brooklyn, N.Y.) with a 864 MHz phase-lock loop (PLL) synthesizer 258 available as SPLL132 from Vari-L Corporation, in Denver, Colo. The PLL has a stand-alone crystal oscillator supplying a 15.36 MHz reference frequency 260 to the PLL. The MCC 486 50 (FIG. 3) is connected to the PLL through an interface 262 and controls the local oscillator frequency produced from the reference frequency in the PLL. A transistor logic controlled signal 262a indicates to the MCC 486 when the PLL is locked.

Amplifiers 264, available as MAV11 from Mini-Circuits Corporation, are fed by regulated power supplies 266. Amplifiers 264 and an attenuator 268 (composed of a MCR18EZHMFX1780 and a MCR18EZHMFX30R1 available from Rohm Corporation, in Kyoto, Japan) regulate an amplitude of the local oscillator frequency signal 21, while a narrow bandpass filter 270 (available as DFC3R860P020 from Murata-Erie Corporation in Smyrna, Ga.) removes any oscillation outside a range of 860 to 870 MHz in the local oscillator frequency sent to the mixer 20.

A low pass LC filter 272 following the mixer acts as a diplexer removing any repeated signal above 1600 MHz in the downconverted signal $s_b(t)$ 22.

Referring also to FIGS. 7A through 7E, the filtered, downconverted signal emerging from low pass filter 272 passes through bandpass filter 23 (available from Networks International Corporation in Lenexa, Kans., as part number C-577) before being sampled by A/D converter 25. Capacitor 300 keeps reference voltage 302 for the converter 25 from oscillating.

The sample points $s_b(i)$ 24 from the A/D converter are stored in FIFO 26, provided by IDT72230L15TP available from Integrated Device Technology, Inc. in Santa Clara, Calif. An asynchronous write enable (ASWE) clock signal 304 from control registry 306 (MC74ACT574N available from Motorola in Phoenix, Ariz.) connected to the FIFO is first synchronized with the A/D converter clock 40 in a counter 307 (available as IDT74FCT161CTP from Integrated Device Technology, Inc.). Counter 307 verifies that the clocks 304, 40 are synchronized over 8 clock cycles for accuracy before the FIFO uses the resulting synchronous write enable clock (SWE) signal 42 to write the converter output.

Sample points $s_b(i)$ from the FIFO are sent to a bidirectional buffer 308 (MC74ACT245N, available from Motorola) that boosts the signal strength of the sample points from the FIFO. Connector 310 (a 108483078003025 available from Elco Corporation in Huntingdon, Pa.) provides a standard interface between resistors 309 connected to bidirectional buffer 308 and the DSP 27 (a TMS 320C31 chip, available from Texas Instruments in Dallas, Tex.).

Figure 5A:
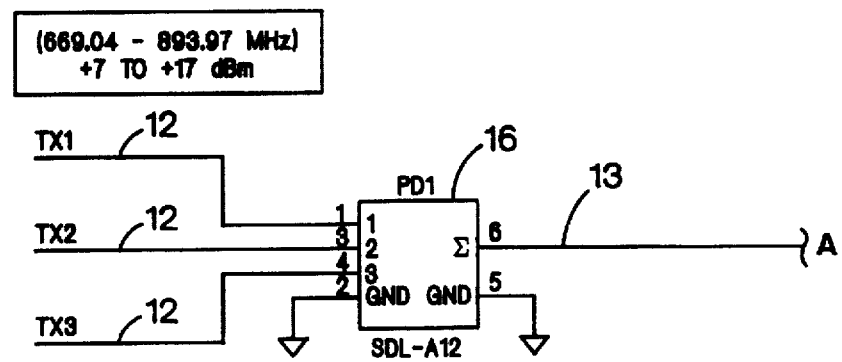
FIGS. 5A through 5C are circuit diagrams of a portion of the sniffer of FIG. 1, including a downconverter and filters processing an incoming wideband signal.
Figure 5A:
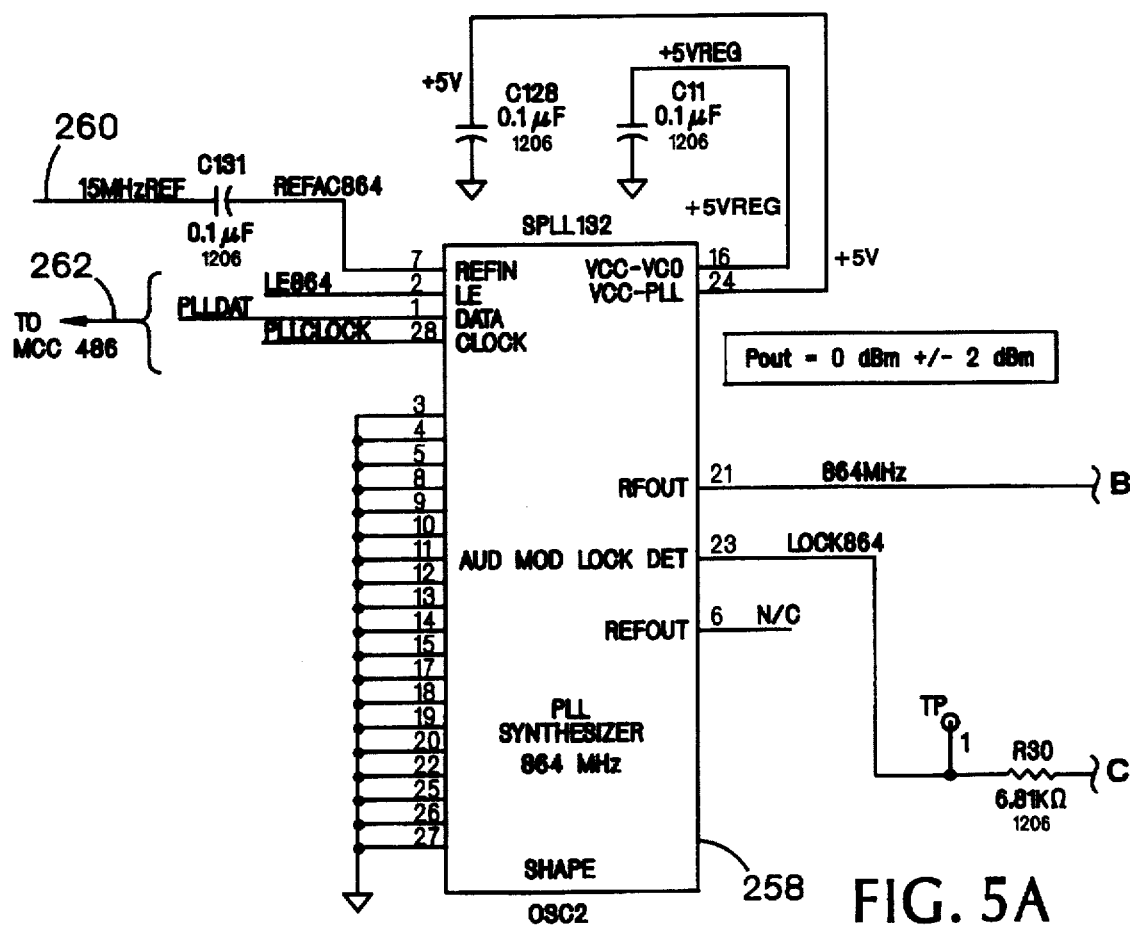
Figure 5B:
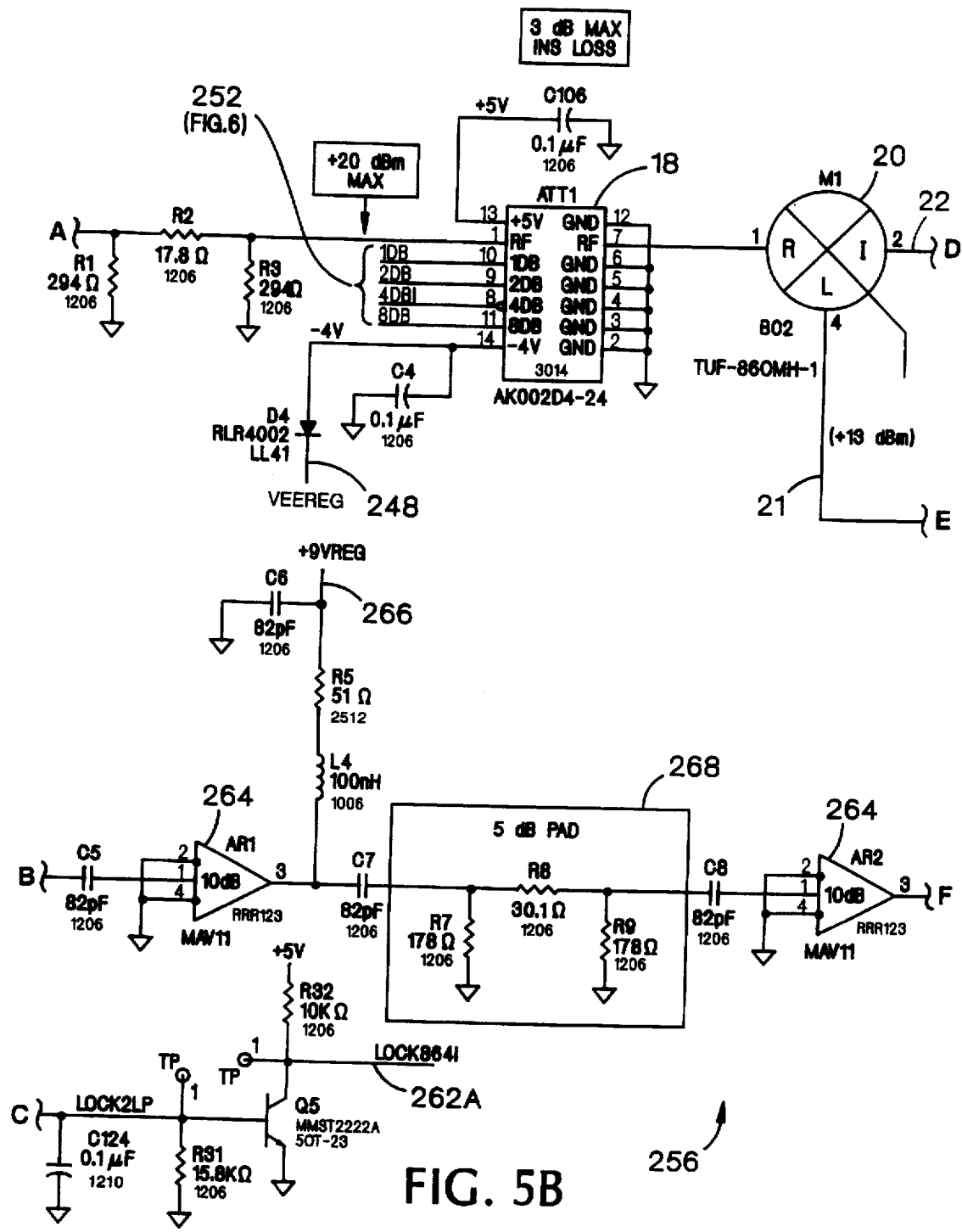
Figure 5C:
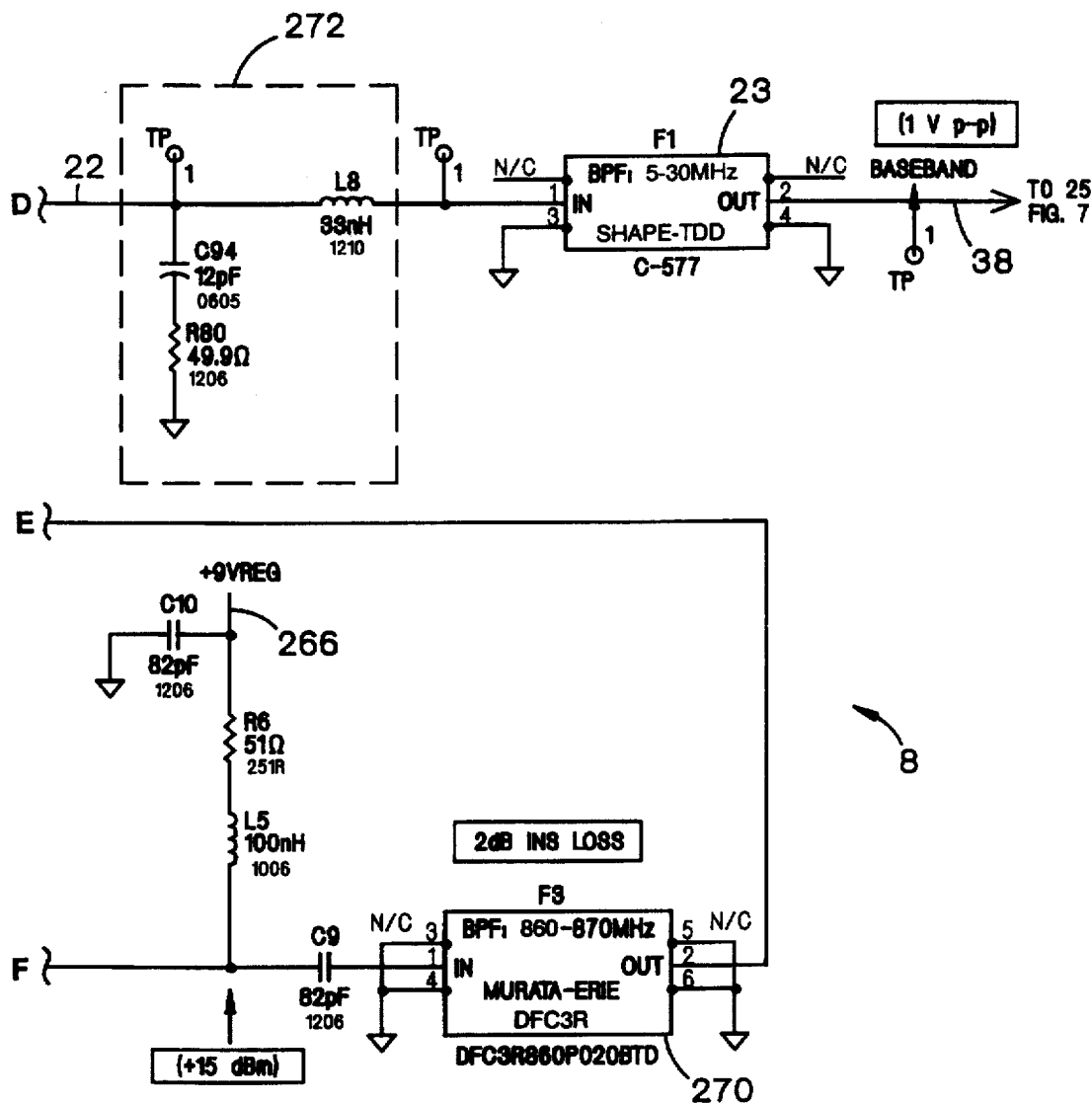
Figure 5D:
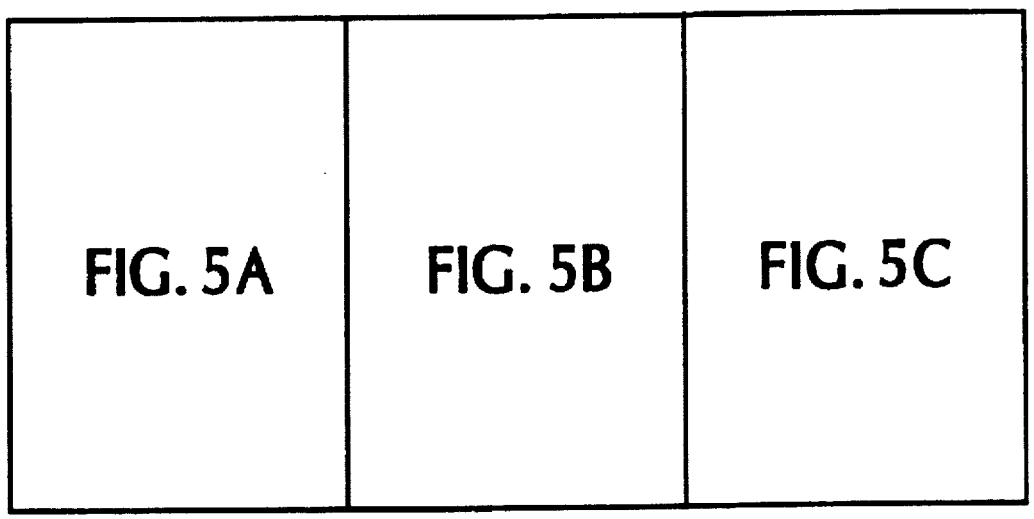
FIG. 5D is a schematic showing how
Figure 6:
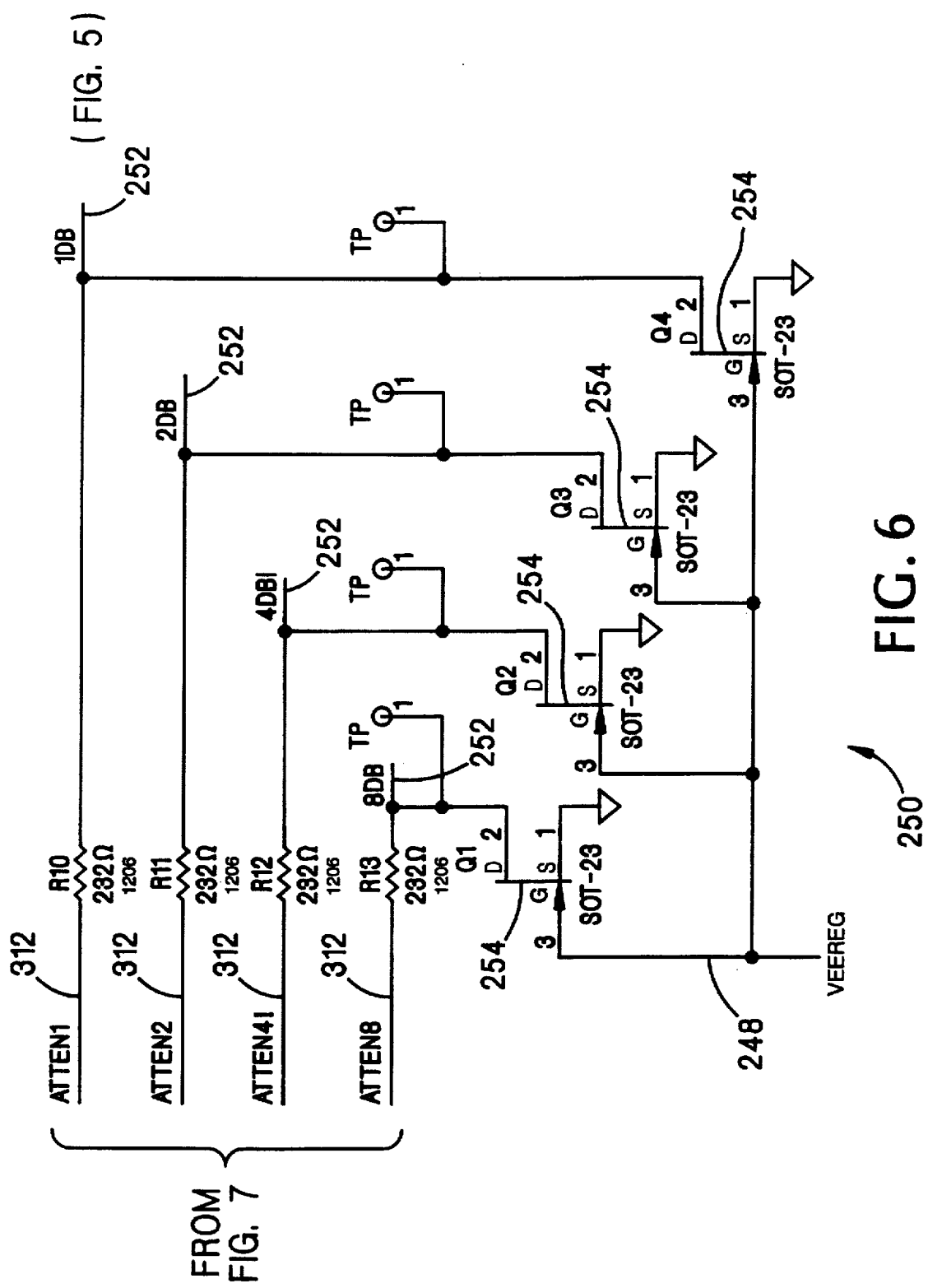
FIG. 6 is a circuit diagram of another portion of the sniffer of FIG. 1, including a controller for a variable attenuator in FIG. 5B.

The DSP also communicates one byte of information at a time over the connector, through the bidirectional buffer 308 to the FIFO. Control registry 306 processes the signals from the DSP to activate an ATTEN signal 312 connected to circuit 250 (FIG. 6). The activated ATTEN signal then activates one of signals 252 controlling variable attenuator 16 (FIG. 5A).

If two bytes are communicated between the DSP and the FIFO at one time, a second, identical bidirectional buffer 314 connected to resistors 315 processes an additional byte from the DSP.

Other embodiments are within the following claims. For example, the sniffer is used outside cellular communications for monitoring any spectrum with equally spaced channels. In particular, high-definition televisions (HDTV) contain A/D converters with the capacity to hold the number of samples required by the sniffer. The sniffer thus replaces a conventional sequential channel scanner in the television to automatically and immediately tune the HDTV to all existing channels.

In addition, the sniffer is coupled to a scanner monitoring multipath fading noise in each channel in the cellular bandwidth. When the scanner reports a noisy channel to the sniffer, the sniffer subsequently classifies that channel as occupied. As a result, the noisy channel does not appear on the best hop list sent to a transceiver. The transceiver thus avoids that channel when initiating a subsequent transmission. Alternatively, a second sniffer with a higher resolution (e.g. a sniffer employing a 16 bit A/D converter) is coupled to the sniffer in place of the scanner.

A portion of the disclosure of this patent document contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. A channel sniffer monitoring channel use by a voice cellular base station transmitting via at least one antenna over channels spanning a broad allocated bandwidth, comprising an attenuating coupler connected to the input of each said antenna, a variable attenuator connected to receive the output of said coupler, a wideband downconverter connected to receive a broadband output from the variable attenuator and configured to frequency shift the received broadband output, a bandpass filter connected to receive the frequency shifted output from the downconverter, an analog-to-digital converter connected to receive an output of the bandpass filter and configured to digitize the received filter output to produce a series of digitized samples, a buffer configured to receive and store the digitized samples, a fast Fourier transform processor connected to receive the samples from the buffer and configured to detect energy levels simultaneously in each of said channels to indicate channels in use by said voice cellular base station, and a selection stage connected to receive said energy levels from the processor, and configured to form a list of free channels, each of said free channels having an energy level below a threshold, the selection stage being further configured to provide the list of free channels to a connected transceiver that transmits signals over the free channels in the order listed.

2. The apparatus of claim 1 wherein said channels comprise narrowband radio frequency channels separated by a constant frequency spacing in said broad bandwidth.

3. The apparatus of claim 1 wherein said downconverter comprises a mixer receiving said output and downconverting said output with a local oscillator frequency below a base frequency of said bandwidth.

4. The apparatus of claim 1 wherein said transform processor is connected to said variable attenuator by a control line, the transform processor communicating with said variable attenuator over said control line to cause said attenuator to adjust an attenuation level said output.

5. The apparatus of claim 2 wherein said analog-to-digital converter comprises a controller causing said converter to sample said output at a sampling frequency ($f_s$) to produce a total number (n) of frequency samples, a ratio ($f_s/n$) corresponding to a constant frequency spacing of said channels.

6. The apparatus of claim 5 wherein said channels comprise cellular channels with said constant frequency spacing corresponding to 30 kHz, said controller causing said analog-to-digital converter to periodically sample said a sampling frequency of 61.44 MHz to produce 2048 total frequency samples.

7. The apparatus of claim 1 wherein said fast Fourier transform processor comprises a Cooley-Tukey transform processor.

8. The apparatus of claim 1 wherein said fast Fourier transform processor comprises a Winograd transform processor.

9. The apparatus of claim 1 wherein said input to each said antenna comprises a cellular voice transmission, and said transceiver comprises circuitry for exchanging cellular digital packet data.

10. The apparatus of claim 1 wherein said selection stage further arranges said list, of channels according to at least one statistic characterizing historical use of a channel.

11. The apparatus of claim 10 wherein said selection stage produces a statistic indicating a likelihood that one of said channels will have a given signal level in the future.

12. The apparatus of claim 11 wherein said selection stage further comprises a memory storing said energy levels, and circuitry determining said statistic from said energy levels, said statistic comprising a static time of at least one of said channels.

13. The apparatus of claim 11 wherein said selection stage further comprises a memory storing said energy levels, circuitry determining said statistic from said energy levels, said statistic comprising a duty cycle of at least one of said channels.

14. The apparatus of claim 1 wherein said downconverter comprises a mixer with a local oscillator frequency of around 864 MHz for downconverting said output.

15. The apparatus of claim 14 wherein said said bandpass filter removes signals outside a pass band between 5 and 30 MHz from said downconverted signal.

16. A method for monitoring channel use by a voice cellular base station transmitting via at least one antenna over channels spanning a broad allocated bandwidth, comprising coupling to an input of each said antenna to receive a broadband input of each said antenna, variably attenuating the input, frequency shifting the attenuated input in a broadband downconverter, bandpass filtering the frequency shifted input, digitizing the filtered input to produce a series of digitized samples, storing the digitized samples in a buffer, fast Fourier transforming the samples from the buffer to detect energy levels simultaneously in each of said channels, comparing said energy levels to a threshold, forming a list of free channels, each free channel having an energy level below the threshold, and providing the list to a transceiver that transmits signals over said free channels in the order listed.

17. The method of claim 16 wherein said channels comprise narrowband frequency channels separated by a constant frequency spacing in said broad allocated bandwidth.

18. The method of claim 16 wherein shifting the input comprises downconverting said input to a frequency below a base frequency of said bandwidth.

19. The method of claim 16 wherein said digitizing comprises periodically sampling said input at a sampling frequency ($f_s$ and producing a total number (n) of frequency samples, a ratio ($f_s/n$) corresponding to a constant frequency spacing of said channels.

20. The method of claim 19 wherein said channels comprise cellular channels with said constant frequency spacing corresponding to 30 kHz, said periodically sampling said input being performed at a sampling frequency of 61.44 MHz and producing 2048 total frequency samples.

21. The method of claim 16 wherein said fast Fourier transforming comprises performing a Cooley-Tukey transform.

22. The method of claim 16 wherein said fast Fourier transforming comprises performing a Winograd transform.

23. The method of claim 16 wherein said input to each antenna comprises a cellular voice transmission, and said transceiver cellular digital packet data signals.

24. The method of claim 16 wherein said forming a list comprises arranging said list of channels according to a statistic characterizing historical use of at least one of said channels.

25. The method of claim 24 wherein calculating said statistic comprises measuring a likelihood of a given future energy level in said one of said channels from said energy levels.

26. The method of claim 25 wherein said forming a list comprises storing said energy levels, said calculating said statistic comprising determining a static time of said one of said channels from said energy levels.

27. The method of claim 25 wherein said forming a list comprises storing said energy levels, said calculating said statistic comprising determining a duty cycle of said one of said channels from said energy levels.

28. The method of claim 16 wherein said shifting comprises downconverting said input to a frequency of 864 MHz.

29. The method of claim 28 wherein said bandpass filtering removes signals outside a pass band between 5 and 30 MHz in said input.

* * * * *